US011225384B2

(12) United States Patent
Karst (10) Patent No.: US 11,225,384 B2
(45) Date of Patent: Jan. 18, 2022

(54) PACKAGING MACHINE

(71) Applicant: Graphic Packaging International, LLC, Atlanta, GA (US)

(72) Inventor: Pete Karst, Canton, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 389 days.

(21) Appl. No.: 16/372,558

(22) Filed: Apr. 2, 2019

(65) Prior Publication Data

US 2019/0308821 A1 Oct. 10, 2019

Related U.S. Application Data

(60) Provisional application No. 62/653,079, filed on Apr. 5, 2018.

(51) Int. Cl.
*B65G 47/34* (2006.01)
*B65B 11/00* (2006.01)
(Continued)

(52) U.S. Cl.
CPC .............. *B65G 47/34* (2013.01); *B65B 5/06* (2013.01); *B65B 11/004* (2013.01); *B65B 41/02* (2013.01);
(Continued)

(58) Field of Classification Search
CPC ......... B65B 5/06; B65B 41/20; B65B 43/145; B65B 35/405; B65B 65/02; B65B 11/004; B65B 61/28; B65B 21/245; B65B 21/06; B65G 2201/0235; B65G 47/841; B65G 47/74; B65G 47/34
See application file for complete search history.

(56) References Cited

U.S. PATENT DOCUMENTS 3,194,381 A * 7/1965 Sherman ................. B65B 21/24
198/419.3
3,225,510 A 12/1965 Wickliffe et al.
(Continued)

FOREIGN PATENT DOCUMENTS

CN 102083694 A 6/2011
CN 106414931 A 2/2017
(Continued)

OTHER PUBLICATIONS

Notification of the First Office Action for CN 201980024182.7 dated Aug. 4, 2021.
(Continued)

*Primary Examiner* — Thomas M Wittenschlaeger
(74) *Attorney, Agent, or Firm* — Womble Bond Dickinson (US) LLP (57) ABSTRACT

A packaging machine includes a series of stations or assemblies, including a carton feeding system and a product conveyor that receives a series of articles or products at a first, upstream or intake end of the packaging machine. The products generally can be grouped into a series of products, such as for forming six-packs, four-packs or other package configurations, and will be wrapped by or loaded into a series of carton blanks, after which the loaded cartons will be moved through a discharge station. The discharge station meters the loaded cartons or packages for discharge from the packaging machine.

12 Claims, 8 Drawing Sheets

(51) Int. Cl.
  *B65B 41/02* (2006.01)
  *B65B 43/14* (2006.01)
  *B65B 5/06* (2006.01)
  *B65B 61/28* (2006.01)
  *B65G 47/74* (2006.01)
  *B65G 47/84* (2006.01)

(52) U.S. Cl.
  CPC ............ *B65B 43/145* (2013.01); *B65B 61/28* (2013.01); *B65G 47/74* (2013.01); *B65G 47/841* (2013.01); *B65G 2201/0235* (2013.01)

(56) References Cited

U.S. PATENT DOCUMENTS

| | | | |
|---|---|---|---|
| 3,794,154 A | 2/1974 | Holt | |
| 3,956,868 A * | 5/1976 | Ganz | B65B 5/024 53/48.1 |
| 4,508,206 A | 4/1985 | Moore et al. | |
| 4,982,551 A | 1/1991 | Nigrelli, Sr. | |
| 5,154,041 A | 10/1992 | Schneider | |
| 5,209,338 A | 5/1993 | Kirtland | |
| 5,485,713 A | 1/1996 | Moncrief | |
| 5,501,318 A | 3/1996 | Disrud | |
| 5,502,950 A | 4/1996 | Moncrief et al. | |
| 5,546,734 A | 8/1996 | Moncrief et al. | |
| 5,560,471 A | 10/1996 | Prochut et al. | |
| 5,592,804 A | 1/1997 | Reuteler | |
| 5,626,002 A | 5/1997 | Ford et al. | |
| 5,638,659 A | 6/1997 | Moncrief et al. | |
| 5,638,665 A | 6/1997 | Muller | |
| 5,657,849 A | 8/1997 | Kirtland | |
| 5,667,055 A * | 9/1997 | Gambetti | B65B 21/06 198/418.7 |
| 5,673,536 A | 10/1997 | Easter et al. | |
| 5,699,651 A * | 12/1997 | Miller | B65G 47/082 53/448 |
| 5,724,785 A | 3/1998 | Malanowski | |
| 5,737,898 A | 4/1998 | Grimm et al. | |
| 5,784,857 A | 7/1998 | Ford et al. | |
| 5,875,880 A | 3/1999 | Johnson | |
| 5,979,147 A | 11/1999 | Reuteler | |
| 6,112,880 A | 9/2000 | Flix | |
| 6,308,817 B1 | 10/2001 | Corniani et al. | |
| 6,490,845 B1 | 12/2002 | Tyreman | |
| 6,527,102 B2 | 3/2003 | De Guglielmo et al. | |
| 6,550,608 B1 | 4/2003 | Brown et al. | |
| 6,575,886 B1 | 6/2003 | Tanck et al. | |
| 6,695,570 B2 | 2/2004 | Ford et al. | |
| 6,732,489 B1 | 5/2004 | Hawley | |
| 6,907,979 B2 * | 6/2005 | Ford | B65B 35/30 198/419.3 |
| 7,104,027 B2 | 9/2006 | Ford et al. | |
| 7,481,309 B2 * | 1/2009 | Wagner | B65G 47/841 198/419.3 |
| 7,503,447 B2 | 3/2009 | Ford | |
| 7,552,570 B2 | 6/2009 | Raudat et al. | |
| 7,624,855 B2 | 12/2009 | Martocchio et al. | |
| 7,726,462 B2 | 6/2010 | Baldanza et al. | |
| 7,726,463 B2 | 6/2010 | Aronsson | |
| 7,815,034 B2 | 10/2010 | Fleck et al. | |
| 8,083,061 B2 | 12/2011 | Fogle et al. | |
| 8,672,117 B2 | 3/2014 | Stahl | |
| 9,079,722 B2 | 7/2015 | de Hertogh | |
| 9,327,855 B2 | 5/2016 | Hurni et al. | |
| 9,327,904 B2 | 5/2016 | Eschlbeck et al. | |
| 9,365,358 B2 | 6/2016 | Barber et al. | |
| 9,573,710 B2 * | 2/2017 | Hendricks | B65B 11/08 |
| 9,708,089 B2 | 7/2017 | Lang | |
| 9,764,904 B2 | 9/2017 | Barber et al. | |
| 9,776,750 B2 | 10/2017 | May et al. | |
| 9,796,537 B2 | 10/2017 | Lang | |
| 9,834,392 B2 | 12/2017 | Raffaini et al. | |
| 9,873,571 B2 * | 1/2018 | Hahn | B65G 47/846 |
| 9,981,808 B2 | 5/2018 | Sullivan et al. | |
| 10,040,586 B2 * | 8/2018 | Laskis | B65B 35/405 |
| 10,046,923 B2 * | 8/2018 | Wagner | B65B 35/40 |
| 10,364,104 B2 | 7/2019 | Mäder | |
| 2002/0043446 A1 | 4/2002 | de Guglielmo et al. | |
| 2004/0050663 A1 * | 3/2004 | Ford | B65G 47/841 198/419.3 |
| 2004/0112714 A1 * | 6/2004 | Davaillon | B65B 21/06 198/470.1 |
| 2005/0229539 A1 | 10/2005 | Raudat et al. | |
| 2005/0230221 A1 | 10/2005 | Guglielmo | |
| 2007/0220836 A1 * | 9/2007 | Reuteler | B31B 50/006 53/491 |
| 2010/0200371 A1 | 8/2010 | Reuteler et al. | |
| 2011/0030311 A1 * | 2/2011 | Martini | B65B 43/185 53/154 |
| 2011/0192116 A1 | 8/2011 | Bachelle | |
| 2016/0145052 A1 | 5/2016 | Overley et al. | |
| 2016/0176656 A1 | 6/2016 | Lang | |
| 2019/0047745 A1 | 2/2019 | Walsh et al. | |

FOREIGN PATENT DOCUMENTS

| | | |
|---|---|---|
| CN | 107413651 A | 12/2017 |
| EP | 0 496 046 B1 | 1/1995 |
| EP | 0 686 583 A2 | 12/1995 |
| EP | 0 860 385 B1 | 11/2000 |
| EP | 1 557 360 A1 | 7/2005 |
| EP | 1 116 676 B1 | 11/2007 |
| EP | 2 637 935 B1 | 5/2015 |
| EP | 2 799 348 B1 | 3/2017 |
| EP | 2 960 188 B1 | 5/2017 |
| EP | 3 281 891 A1 | 2/2018 |
| GB | 2 316 926 A | 3/1998 |
| JP | 2011-510878 A | 4/2011 |
| WO | WO 97/44248 | 11/1997 |
| WO | WO 99/14122 A1 | 3/1999 |
| WO | WO 2009/097546 A1 | 8/2009 |
| WO | WO 2015/187128 A1 | 12/2015 |
| WO | WO 2016/202557 A1 | 12/2016 |

OTHER PUBLICATIONS

International Search Report and Written Opinion for PCT/US2019/025285 dated Jul. 19, 2019.
Supplementary Partial European Search Report for EP 19 78 1086 dated Nov. 18, 2021.
Notice of Reasons for Refusal dated Nov. 29, 2021 for JP 2020-554206.

* cited by examiner

PACKAGING MACHINE

CROSS REFERENCE TO RELATED APPLICATIONS

The present patent application is a formalization of previously filed, co-pending U.S. Provisional Patent Application Ser. No. 62/653,079, filed Apr. 5, 2018 by the inventor named in the present application. This patent application claims the benefit of the filing date of this cited Provisional Patent Application according to the statutes and rules governing provisional patent applications, particularly 35 U.S.C. § 119(e), and 37 C.F.R. §§ 1.78(a)(3) and 1.78(a)(4). The specification and drawings of the applications referenced above are specifically incorporated herein by reference as if set forth in their entirety.

FIELD OF THE INVENTION

The present invention relates to a packaging machine, and in particular, to packaging machines that incorporate discharge assemblies or systems or stations for controlling the discharge of product packages from the packaging machines.

BACKGROUND

Packaging machines that place products, such as cans, bottles and other products into cartons, such as paperboard cartons, are well known. These packaging machines include, but are not limited to, those which place articles or products into a wrap-type cartons, basket-type cartons or sleeve-type cartons. One example of a packaging machine that packages articles, such as cans or bottles into a wrap-type carton is the Marksman® line of machines, including the Marksman® MM2 brand machine manufactured by Graphic Packaging International, LLC. Other types of packaging machines are especially adapted to package products into sleeve-type or fully enclosed cartons and basket-type cartons, including Graphic Packaging International, LLC's Quikflex® and Autoflex® brand machines. Many of these machines include one or more elongate conveyor systems that can extend from a carton blank feeder positioned at a first end or upstream section, to a second end or downstream section where the filled cartons or packs are discharged. The conveyor moves the products or articles to be packaged, such as bottles or cans, and the cartons or carton blanks that are filled with such products through various units or stations that incorporate the necessary components that perform required functions to form completed packages that will be discharged from a downstream or discharge end of the packaging machine.

For example, in packaging machines designed to process wrap-type cartons, the products can be delivered to the machine in a mass, and moved to an article or product selection station where they are grouped into desired configurations, such as a 2 by 3 article group, a 2 by 2 group, or a 2 by 4 group of articles. Other group configurations are possible. In addition, a carton blank feeder will deliver carton blanks, generally one at a time, to a station that wraps the blank around a formed article group, such as a group of six articles (a "6 pack") arranged in a 2×3 configuration. These wrap-type carton blanks also can have a locking assembly, typically tabs and either slits or holes, that cooperate or engage with one another on opposite bottom edges to close the wrap-type carton blank around the article group. After the carton blanks are wrapped around the article group, the group is held securely within the now formed and filled carton or pack.

As used herein the term "carton blank" refers to either a flat blank or to a carton blank that has been partially constructed, for example by gluing, especially for sleeve-type carton blanks. The term "carton" or "pack" refers to a carton blank that has been fully assembled either around or that receives and/or otherwise contains the articles. Carton blanks adapted to wrap around an article group and machine elements to accomplish that are well known, as shown in U.S. Pat. No. 5,673,536 and U.S. Pat. No. 6,550,608, both owned by Graphic Packaging International, LLC, the present owner of the inventions disclosed herein, and both of which are incorporated in their entirety herein by reference.

After the completed product packages are formed, the packages generally are discharged from the packaging machine, for example, being passed to a divider station where the packages can be separated into multiple lanes, and also can be turned or reoriented as needed. In many cases, the packages are come out of the packaging or wrapping stations of the packaging machine in a substantially close or abutting arrangement station, such that gaps need to be created therebetween to allow the packaged to be divided into separate lanes. One problem is that to create such gaps or separation, the leading products generally must be accelerated or moved at different speeds, typically by engaging the products with faster moving lugs, which can cause damage such as forming dents in cans, or possibly breakage with more fragile products.

Accordingly, it can be seen that a need exists for a packaging machine/system that addresses the foregoing and other related and unrelated problems in the art.

SUMMARY

Briefly described, the present invention generally relates to packaging machines for loading or application of cartons or carton blanks with/to products/articles or groups of products/articles. In one aspect, the packaging machine can include a series of stations or assemblies, including a carton feeding system and a product conveyor that receives a series of articles or products at a first, upstream or intake end of the packaging machine. The products generally can be grouped into a series of products, such as for forming six-packs, four-packs or other package configurations, and loaded or placed into flights of the product conveyor for movement through the packaging machine. An overhead lug conveyor can be located downstream from the carton feeding system and will receive and guide the carton blanks from the carton feeder and into registration with the groups of products. Thereafter, the product groups, with the carton blanks applied thereto, will be moved though one or more downstream folding and wrapping or packaging assemblies or stations of the packaging machine.

As the groups of products pass through the folding and wrapping station(s), the cartons/blanks will be folded thereabout and locking tabs or other locking features of the cartons/blanks can be engaged to substantially secure the cartons/blanks thereabout. Alternatively or additionally, in some embodiments, adhesive applicators also could be provided along the path of travel of the cartons/blanks and articles to apply and adhesive to help secure the panels and/or flaps of the cartons/blanks in a locked configuration around the articles. The completed cartons, packs or packages then will be passed through a discharge station, which can include drive or compression belts and a metering lug assembly that controls the release/discharge of the completed packages to a divider station, where the packages can be divided into lanes and/or turned as needed to help reorient the packages for discharge from the packaging machine.

The discharge station generally will be positioned downstream from the packaging and wrapping station(s), and will receive the completed product packages, with the packages typically moving in a line, in substantially end-to-end abutment. The packages initially are received between spaced compression or drive belts that are moving at a different rate from the rate of movement of the incoming packages. The compression or drive belts begin the acceleration of the packages to create a spacing or pitch between the packages that substantially matches a pitch or rate of the downstream divider conveyor. Thereafter, the packages are engaged by pairs of pusher lugs driven by lug chains or belts of the metering assembly at a rate substantially matching the rate of movement of the drive belts and packages moving therewith.

The pusher lugs generally will be vertically spaced apart and located so as to strategically engage the endmost products of each package at locations where the products typically are strongest, i.e. for cans, that generally can be close to the bottom and close to the top rim. The spaced engagement of pusher lugs against the products/packages will help control the further movement and acceleration of the packages through the discharge station and onto a conveyor of the divider station, while generally minimizing potential damage thereto.

The combined engagement of the packages by the drive belts and spaced pusher lugs enables the packages to be smoothly accelerated in a controlled manner sufficient to create the desired gaps or spacing's therebetween within a short span or space between their release from the packaging or wrapping station and their subsequent metered discharge into the divider station. In addition, the combined engagement of the packages with the drive belts and pusher lugs cooperatively moving at substantially the same speed can help extend the life of the drive belts by avoiding pulling of the packages away from the belts by the pusher lugs. The drive belts also can be laterally adjustable to take-up or accommodate for increased give or some expansion of the drive belts over extended use, to further help extend the life of the drive belts.

Various objects, features and advantages of the present invention will become apparent to those skilled in the art upon a review of the following detailed description, when taken in conjunction with the accompanying drawings.

Embodiments of the invention and the various features thereof are explained below in detail with reference to non-limiting embodiments and examples that are described and/or illustrated in the accompanying drawings. It should be noted that various features illustrated in the drawings are not necessarily drawn to scale, and that features of one embodiment may be employed with other embodiments as the skilled artisan would recognize, even if not explicitly stated herein. Those skilled in the art will thus appreciate and understand that, according to common practice, the dimensions of various features and elements of the drawings may be expanded or reduced to more clearly illustrate the embodiments of the present disclosure described herein. In addition, descriptions of certain components and processing techniques may be omitted so as to not unnecessarily obscure the embodiments and/or features of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

DETAILED DESCRIPTION

Figure 1A:
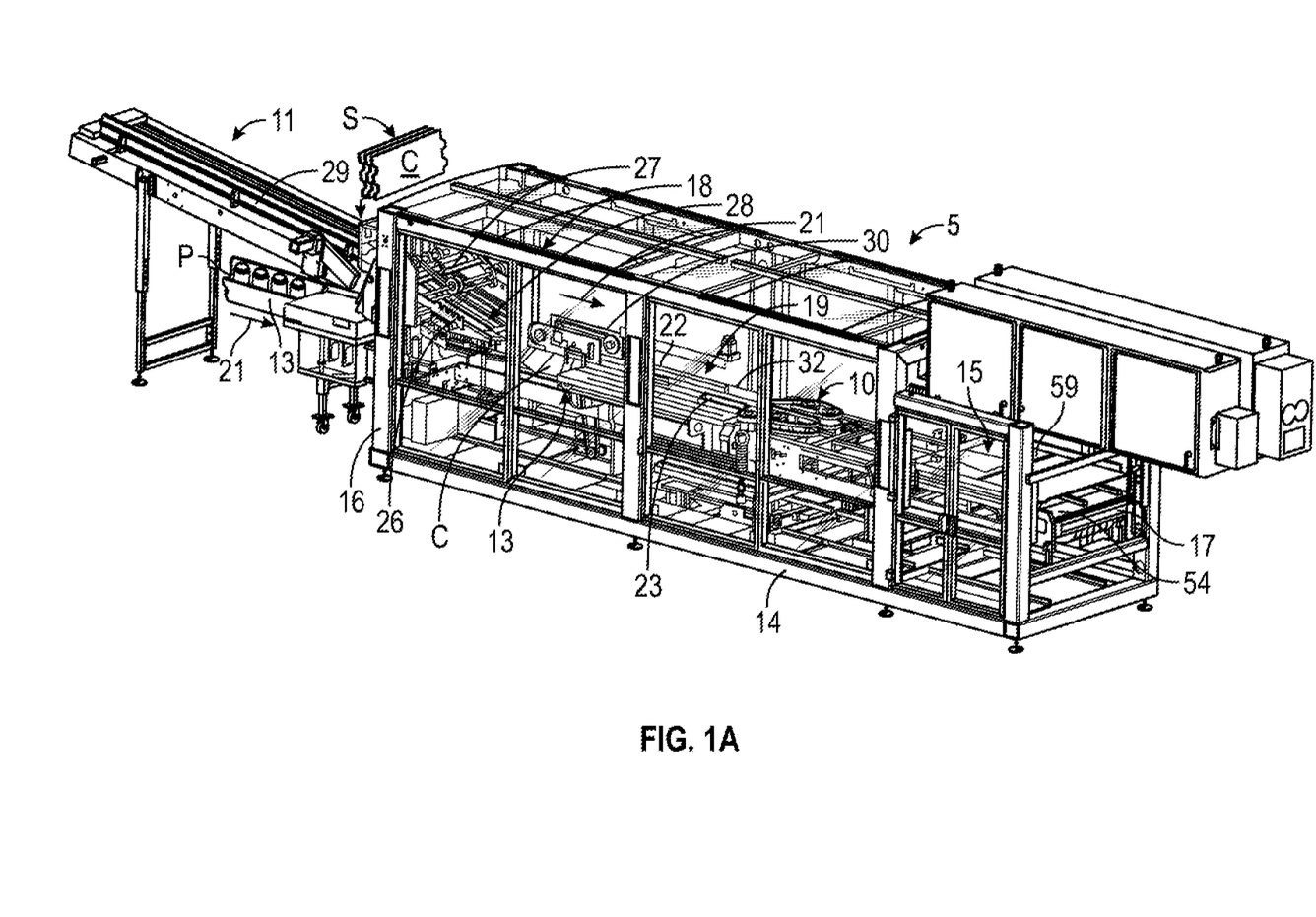
FIG. 1A is a perspective view illustrating one embodiment of a packaging machine with a discharge system or station according to the principles of the present invention.
Figure 1B:
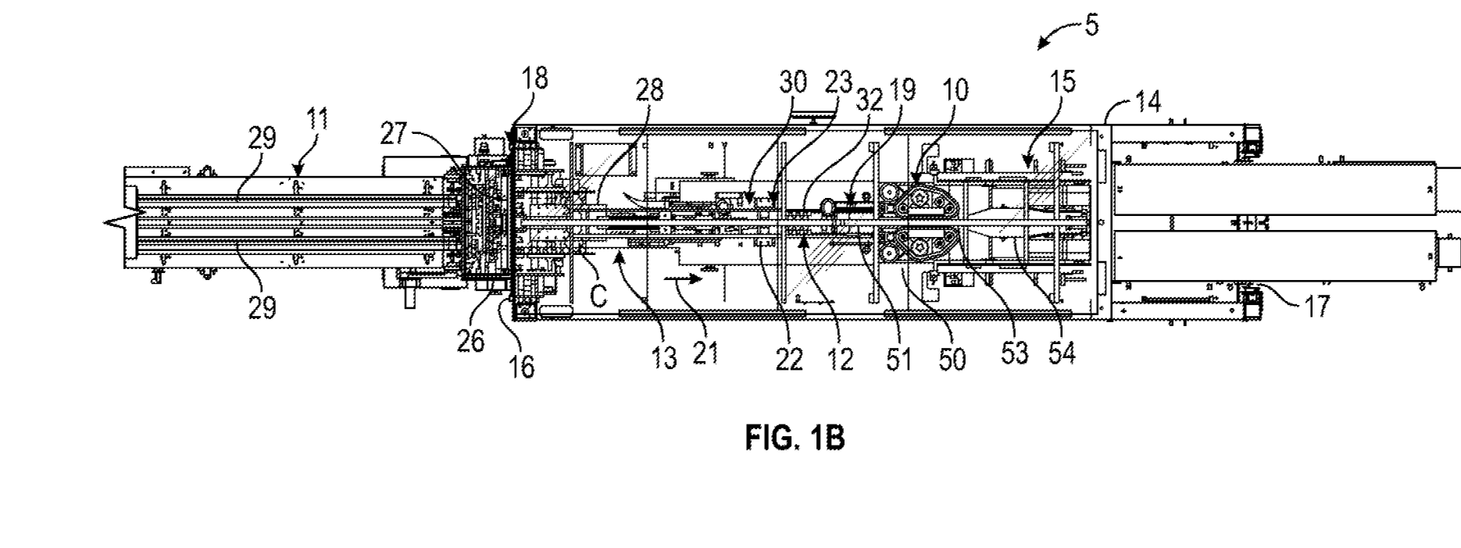
FIG. 1B is a plan view of the packaging machine of FIG. 1A.

Referring now to the drawings in which like numerals indicate like parts throughout the several views, FIGS. 1A-1B illustrate aspects of a packaging machine 5 with a discharge station or system 10 according to the principles of the present invention. The packaging machine 5 is illustrated as feeding and applying flat-blank, wrap style cartons C (FIG. 1A) selected or picked from a stacks of cartons/blanks C contained within a magazine 11, individually, into registration with articles/products or groups or articles/products P moving along a product conveyor 13 of the packaging machine 5 or similar apparatus. The discharge system 10 further enables the velocity or speed of the completed or finished product packages 12 (FIGS. 2-6) to be controlled so that the packages can be smoothly discharged from the packaging machine and/or transitioned, such as to a downstream divider station 15, with potential damage to the products or mis-feeding thereof being substantially minimized, and which can further help extend the useful life of components of the discharge station, such as compression belts.

The packaging machine 5 (FIGS. 1A-1B) generally will include an elongated frame 14 with a first, upstream or input end 16 and a second, downstream or output end 17. A series of stations or assemblies, including a carton feeding system 18, the product conveyor 13, and one or more wrapping or packaging stations 19 will be provided along the frame and path of travel 21 of the products through the packaging machine. By way of example only, the wrapping or packaging stations can include a series of carton folding elements or mechanisms 22 and tucking mechanisms 23 for securing the ends of the cartons/blanks about their associated products or groups of products P, to form completed cartons. Examples of such wrapping or packaging stations are found in U.S. Pat. Nos. 9,776,750 and 6,550,608, the disclosures of which are incorporated by reference as if set forth fully herein; and, in addition or as a further alternative, adhesive applicators also could be provided for applying an adhesive material to help attach the ends of the carton blanks as needed. The packaging machine 5 also will include the discharge station 10 located downstream from the wrapping or packaging station(s), and can have a turner/divider station or assembly 15 between the discharge station 10 and the output end 17 of the packaging machine, as indicated in FIGS. 1A-1B. An example of a turner/divider station can be found in U.S. Pat. No. 7,503,447, the disclosure of which is incorporated by reference as if set forth fully herein.

Figure 2:
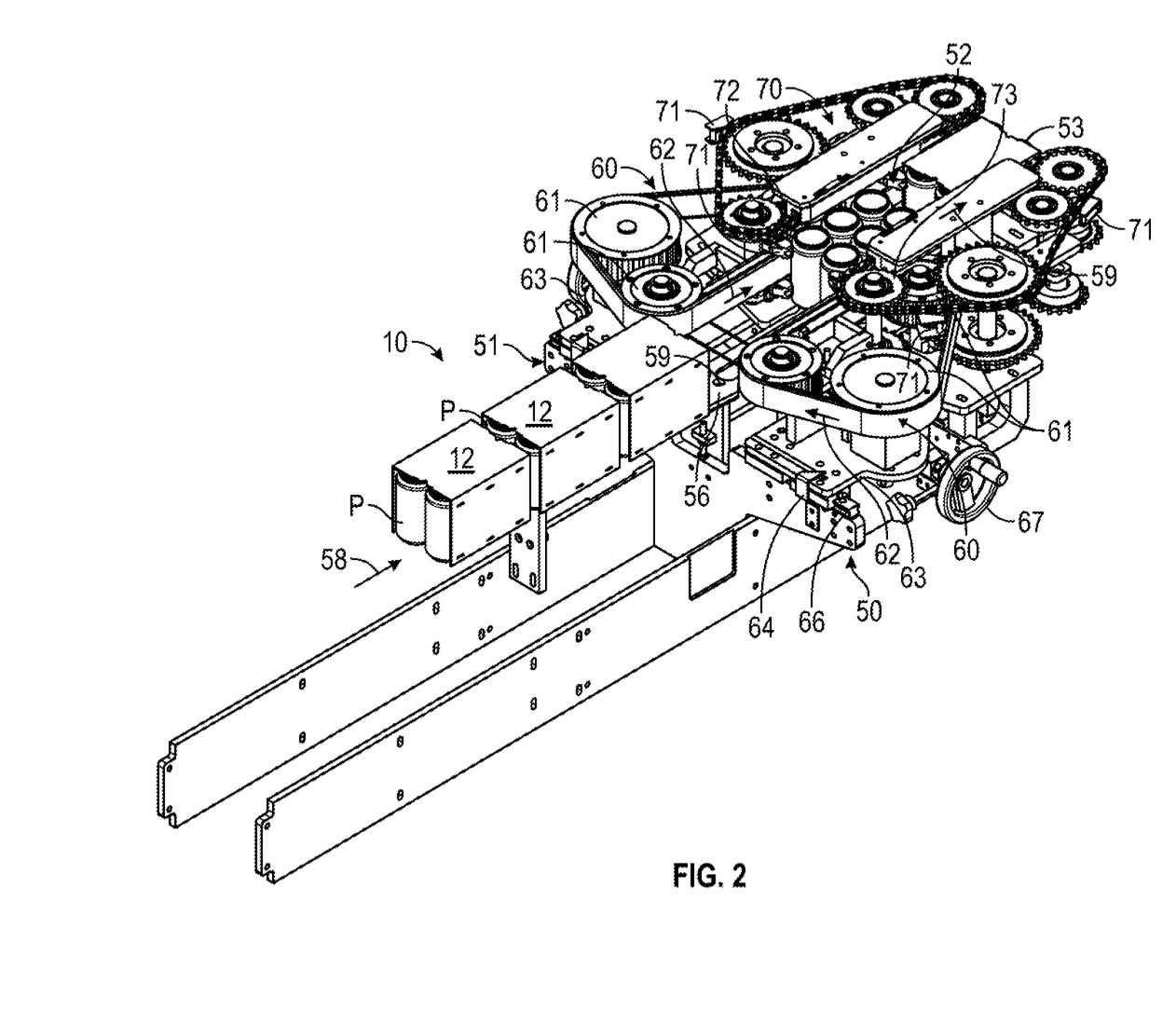
FIG. 2 is a perspective view of a discharge station according to the principles of the present invention.

As illustrated in FIGS. 1A and 2, the carton feeding system 18 will be located adjacent the input or upstream end of the frame of the packaging machine, and generally includes a frame 26 supporting the operative elements thereof, including a picking assembly 27, carton guide or chute 28 and lugged feeder chains. The magazine 11 generally is located upstream from the carton feeding system, and includes a conveyor 29 along which stacks of cartons C (FIG. 1A) are supported and moved for feeding into the packaging machine by the carton feeding system. The carton feeding system picks and feeds the carton blanks individually from the magazine and along a path of travel toward registration with the products P moving along the product conveyor 13.

Typically, the products will be engaged by the carton blanks, which will be wrapped thereabout to form a product pack or package of a selected size and/or configuration. For example, as indicated in FIGS. 2-6, in one aspect, the articles/products P being packaged can include cans or bottles arranged in groups of six cans, i.e. to form a 6-pack. It will, however, be understood that a variety of other products also can be packaged, without departing from the scope of the present invention. In addition, the products further can be grouped and packaged in various ways, for example, into groups of 4, 6, 8, 12, etc. for forming 4 packs, 6 packs, 8 packs, or any other size or configuration packages.

An overhead lug conveyor 30 can be mounted downstream from the carton feeding system, as indicated in FIGS. 1A-1B. The overhead lug conveyor will include a series of overhead lugs that are moved into contact with the carton blanks, generally taking over the pushing/driving movement of the cartons/blanks from the lugs of the carton feeding system. The lugs of the overhead lug conveyor will move each of the carton blanks into registration with an associated or corresponding group of products moving along the product conveyor 13.

Thereafter, the overhead lug conveyor will continue to move the carton blanks in registration with and applied to corresponding or associated products or product groups, as the associated or corresponding products or product groups are moved by the product conveyor into and through the downstream packaging and/or wrapping station(s) 19. As the products and carton blanks move through the product packaging and/or wrapping station(s), the sides of the carton blanks can be folded or wrapped about the products and the ends of the carton blanks can be secured together, such as by moving the carton blanks along rails that urge/direct the sides of the carton blanks to a folded configuration, and further by moving locking tabs of the carton blanks into engagement. Once the product packages 12 (FIGS. 2-6) are completed or formed, they can be passed moved into and along a guide channel 32 which directs the packages into the discharge station 10.

As indicated in FIG. 1B, the discharge station 10 has a frame 50 and is located along the product conveyor 13 downstream from the wrapping or packaging station(s) 19, and receives the wrapped or substantially completed packages 12 (FIG. 2) at an input or upstream end 51. The packages 12 generally are received at the upstream or input end 51 of the discharge station 10 in a line, with the packages typically being in substantially end-to-end abutment, and as they are passed through the discharge station, gaps or spacings 52 of a desired amount or size will be formed in the line of packages prior to the packages being discharged from a downstream or output end 53 of the discharge station. As indicated in FIGS. 1A and 1B, the packages generally will be discharged to one or more discharge conveyor(s) 54 of the divider station 15, along which the packages can be divided into a series of lanes and/or turned or reoriented. The gaps or separations 52 between the products further will be formed at a pitch that substantially matches the pitch of the divider station conveyor 54 so as to enable the packages to be individually received and separated into the lanes of the divider station and/or reoriented or turned as needed by the divider station.

As indicated in FIGS. 2-5, the frame 50 of the discharge station 10 generally can be adjustably mounted on the frame of the packaging machine. The frame 50 of the discharge station also will include a bed plate 56 that extends from the input or upstream end 51 through the discharge station and to its downstream or discharge end 53. The bed plate typically will have a smooth, non-stick surface 59 on which the packages are received and moved along a path of travel 58 through the discharge station as the gaps or spacings 52 are formed therebetween.

As the packages 12 enter the discharge station 10, the packages generally are engaged by a pair of drive belts 60 positioned along each side of the path of travel 58 of the packages 12 through the discharge station. The drive belts can be sized and located so as to engage selected portions along the height of each of the packages. The drive belts 60 further can be made from a non-skid material, such as a rubberized or other, similar material, that enables the belts to substantially engage the sides of the packages without slipping and without marking the sides of the packages. The drive belts 60 generally will be engaged against the sides of the packages in a compressive or bearing engagement, with the drive belts engaging the sides of the packages with sufficient force to provide a frictional engagement as necessary for urging or moving the packages forwardly and along the bed plate 56, without unduly compressing or damaging the products contained within the packages, as indicated in, for example, FIG. 6.

As FIGS. 2-5 illustrate, the drive belts 60 generally will be extended about a series of sprockets or pulleys 61, with at least one of the sprockets or gears 61 being driven such as by a motor or other drive so as to drive the drive belts along a path of travel indicated by arrows 62. For example, at least one drive sprocket for each of the drive belts can be driven by a motor so that the drive belts are driven in a timed, cooperative relationship; or alternatively, both of the belts can be drive by a single motor linked to their drive sprockets. As still a further alternative, the drive sprockets for the drive belts also could be linked to and/or driven by the drive system for the product conveyor, such as by gears, belts or other connections.

Figure 5:
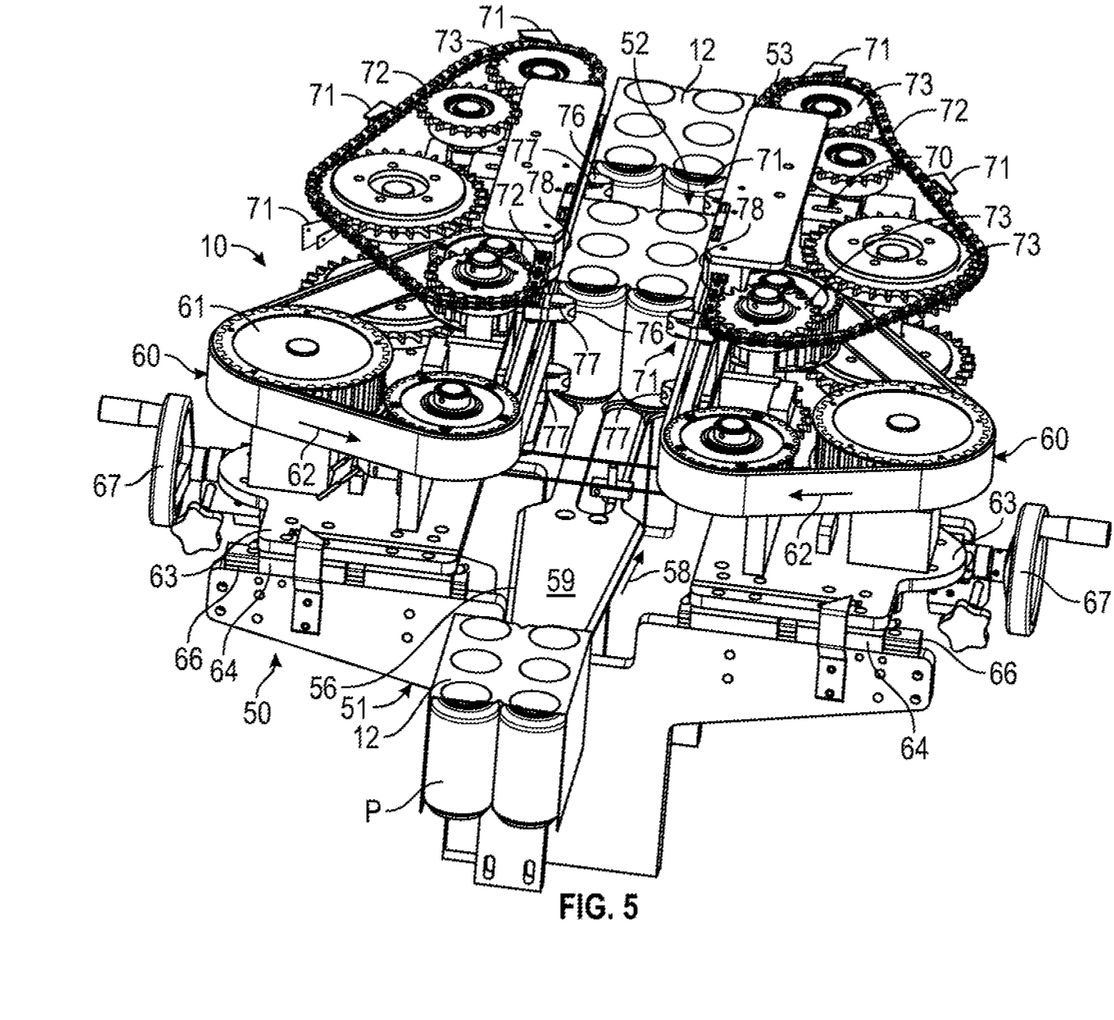
FIG. 5 is an end view, taken in perspective, showing engagement of packages by the drive belts and pusher lugs of the discharge station of FIGS. 2-4.
Figure 6:
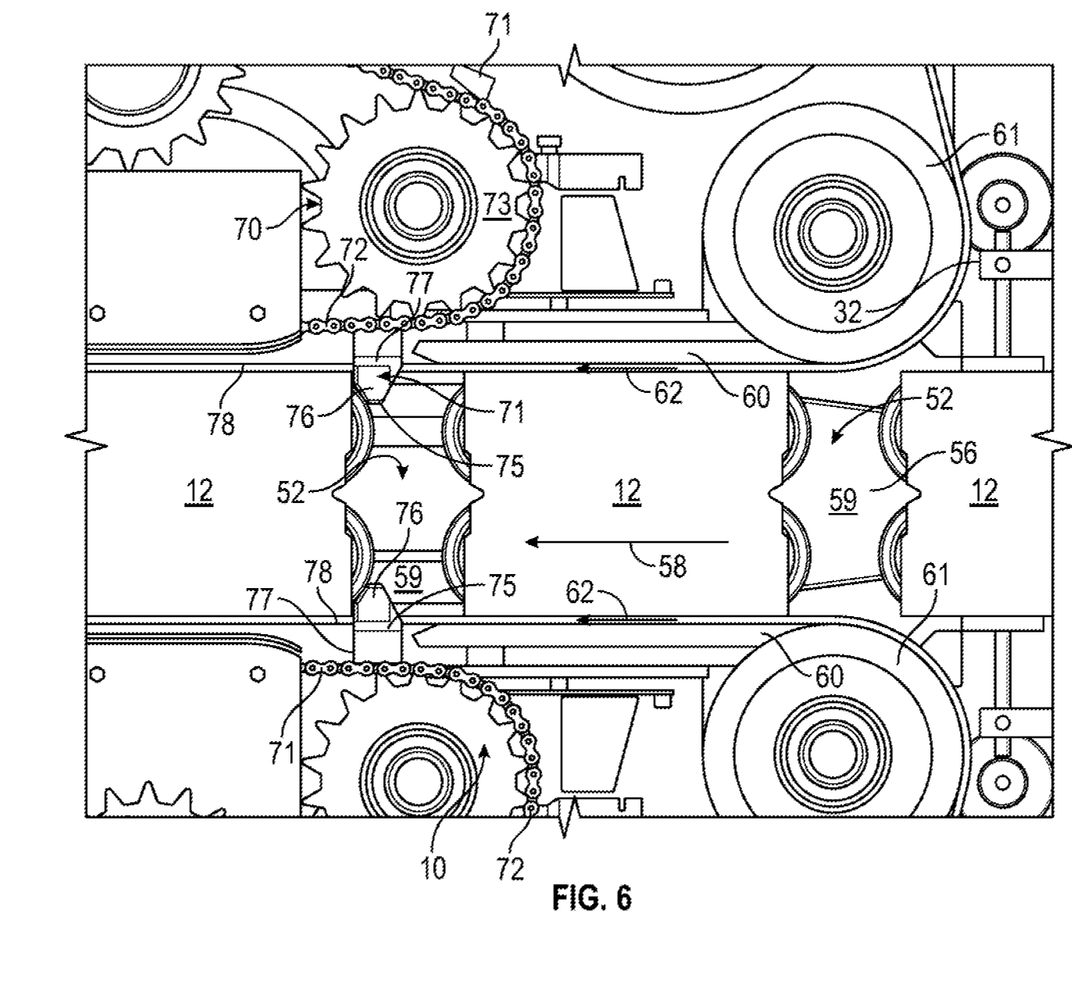
FIG. 6 is a plan view of the discharge station of FIGS. 2-5.

In addition, the drive belts 60 and the pulleys 61 about which they are extended can be mounted on moveable supports such as support plates 63 of the discharge station frame 50. As indicated in FIGS. 3B and 5, the support plates 63 can include bearing guides or slide brackets 64 that engage tracks 66 of the discharge station frame. A hand wheel or other, similar adjustment mechanism 67 also can be provided to control/effect the sliding movement of the support plates 63, and thus the drive belts 60 being carried therewith, toward and away from the path of travel 58 of the packages 12 through the discharge station. As a result, the positioning of the drive belts 60 can be individually adjusted with respect to the packages as needed to accommodate varying size or width packages. In addition, as the drive belts begin to show signs of wear or increased give or stretch during use and over their life, the drive belts can be adjusted or moved inwardly toward the path of travel of the packages as needed to help maintain sufficient frictional engagement therewith, and thus allow the useful life of the belts to be extended.

Figure 3A:
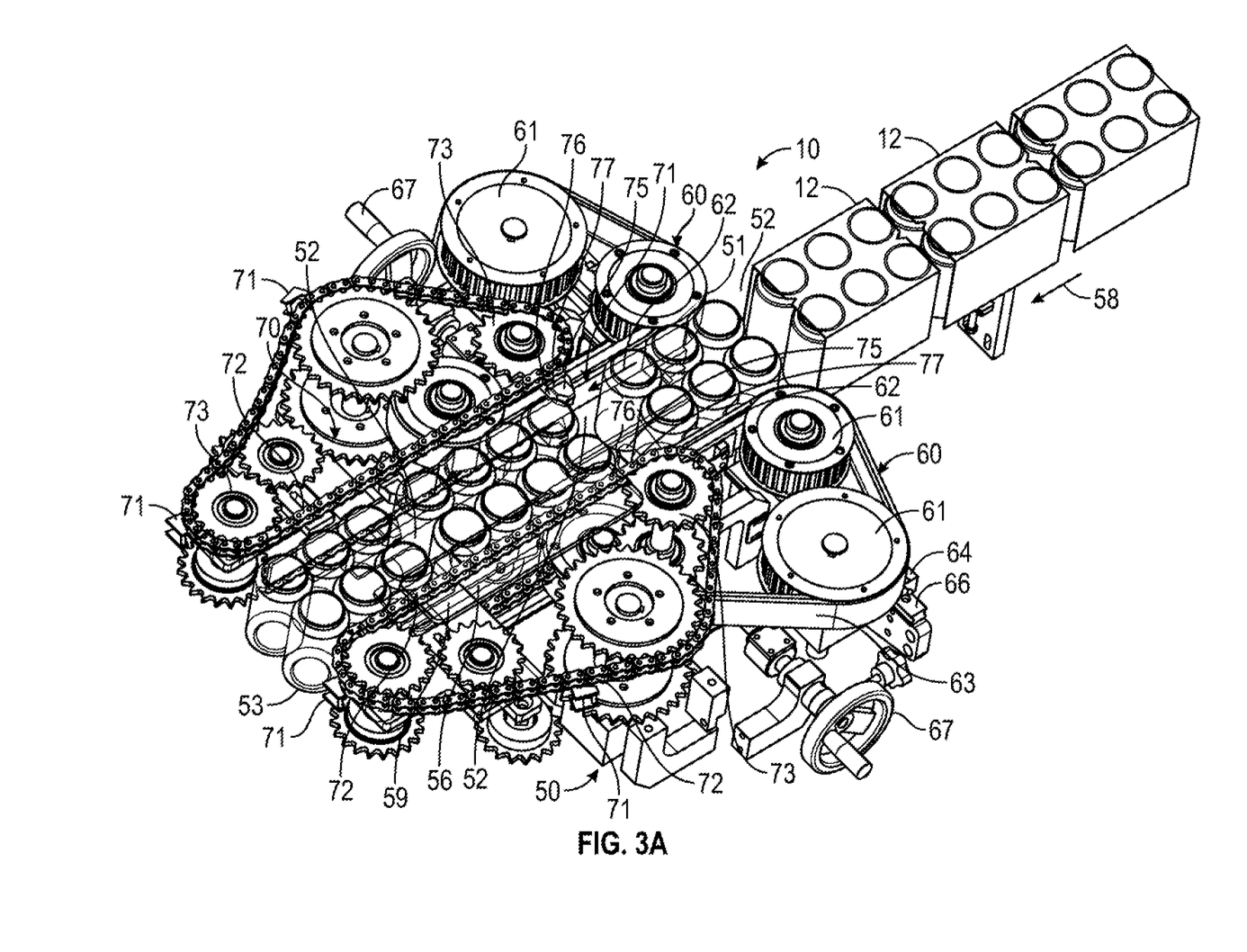
FIGS. 3A-3B are further perspective views of the discharge station of FIG. 2.
Figure 3B:
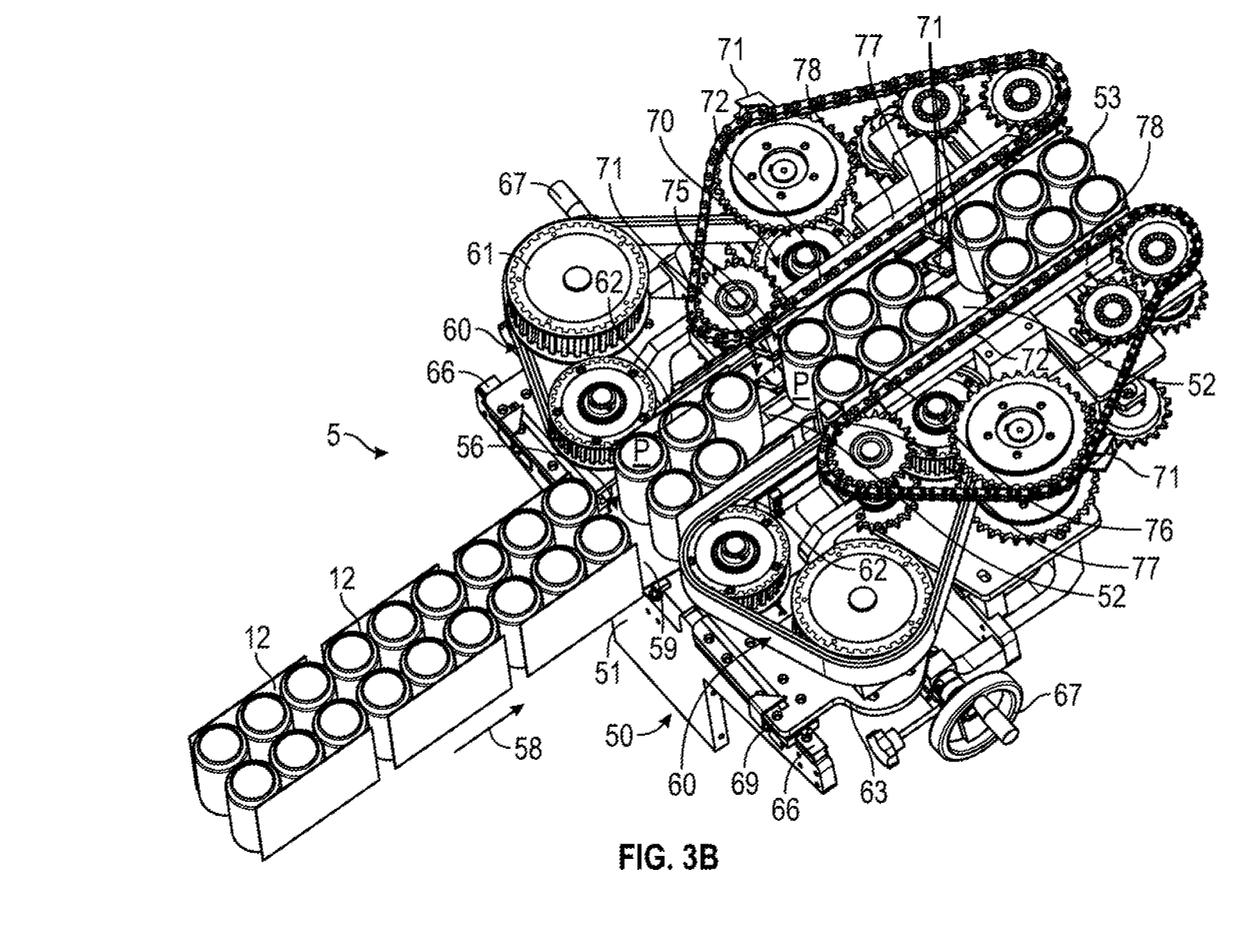
Figure 4:
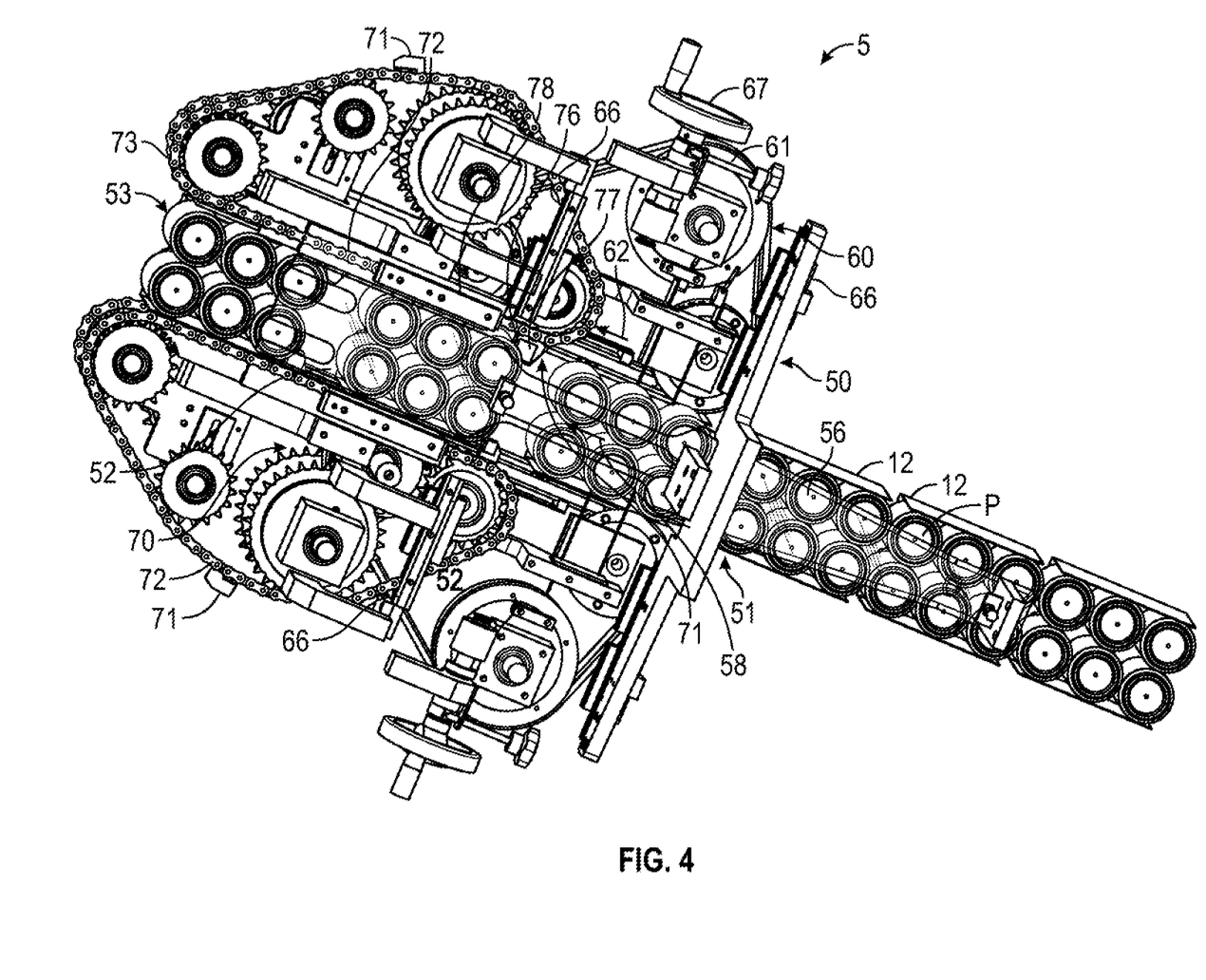
FIG. 4 is a bottom view, taken in perspective, of the discharge station of FIGS. 2-3B, showing separation of packages therein.

As the packages are engaged by the drive belts, the drive belts move or accelerate the packages forwardly along the bed plate 56 so as to create the desired gaps or spacings 52 between the engaged packages and the line of packages coming into the discharge station, as generally indicated in, for example, FIGS. 3A and 3B. Thereafter, the separated packages will be engaged by a metering assembly or section 70 of the discharge station 10 that meters/feeds the packages into the divider station.

As indicated in FIGS. 3A-5, the metering assembly 70 includes a series of pusher lugs 71 that can be mounted on chains or belts 72 that carry the pusher lugs 71 along the path of travel of the packages 12, and in a substantially elliptical movement. The pusher chains 72 generally can be extended about drive gears or sprockets 73 that can be driven by one or more motors. The pitch or spacing of the pusher lugs along their drive chains also generally will be set according to the size of the package moving through the discharge station, for example, being set for a 4-pack, 6-pack, 8-pack, etc. and to accommodate or further help define a pitch or spacing between the packages by the discharge station that substantially matches the pitch of the downstream divider station or discharge conveyor(s) 54.

Each of the pusher lugs 71 (FIGS. 3A-3B and 5) generally includes a body 75 having a forward, pushing edge or surface 76 and a cam portion or tab 77 along the upper surface thereof. The cam portions of each of the pusher lugs generally will engage and ride along cam tracks 78, as indicated in FIG. 3B, that cause the pusher lugs to be pivoted into engagement with the endmost products P at the back ends of the packages 12, e.g., the endmost products on opposite sides of the product packages, and maintain the pusher lugs in bearing or pushing engagement therewith until the packages reach the discharge end 53 of the discharge station. At that point, the cam portions 77 of the pusher lugs generally will be disengaged from their cam tracks 78, allowing the pusher lugs to be released from driving and/or pushing engagement with the products and to thereafter rotate away and out of contact with the products/packages as the packages are released to the divider station.

As further generally indicated in FIGS. 2-3B and 5, the pusher lugs 71 of the metering assembly 70 will be arranged in vertically spaced pairs or sets of pusher lugs that are strategically spaced and/or located so as to engage the endmost products of the packages at locations that typically are stronger and/or more resistant to damage. For example, for 12-ounce cans such as shown in the figures, the pusher lugs can be spaced/located and configured to engage the rearmost cans of each package adjacent an upper rim portion and a bottom portion of each of the cans (i.e. where the cans typically are stronger and/or more resistant to contact), as opposed to engaging the cans substantially along a middle or intermediate portion between the two ends thereof, where the bodies of the cans typically are weaker and/or more susceptible to being dented or otherwise damaged by contact. The pusher lugs 71 further will be spaced apart so as to avoid contact or engagement of the drive belts with the pusher lugs as the pusher lugs engage and take over the forward movement of the packages along the bed plate from the drive belts. In addition, different size or spacings of the pusher lugs also can be provided, as well as different size drive belts, depending upon the sizes and configurations of the product packages moving through the packaging machine.

The spaced product packages thereafter will be individually discharged from the discharge station 10 in a metered fashion with the desired pitch or gap defined between each of the successively released or discharged packages substantially matched to the pitch of the divider station. As a result, the product packages are released individually and at a spacing or pitch that substantially matches the pitch of the downstream divider station conveyor to enable the product packages to be smoothly and easily segregated or divided into differing lanes as needed, and turned or reoriented if needed as well, for release from the packaging machine.

The foregoing description of the disclosure illustrates and describes various embodiments. As various changes can be made to the above construction without departing from the spirit and scope of the present invention as disclosed herein, it is intended that all matter contained in the above description or shown in the accompanying drawings shall be interpreted as illustrative and not in a limiting sense. Furthermore, the scope of the present disclosure shall be construed to cover various modifications, combinations, alterations, etc., of the above-described embodiments that are within the scope of the claims of this application.

Additionally, while the disclosure shows and describes selected embodiments of the present invention, the invention is capable of use in various other combinations, modifications, and environments, and is capable of undergoing a variety of changes or modifications than the scope of the inventive concepts as expressed herein, commensurate with the above teachings, and/or within the skill or knowledge of the relevant art. Furthermore, various features and characteristics of each embodiment may be selectively interchanged and applied to the other illustrated and non-illustrated embodiments of the disclosure.

The invention claimed is:

1. A packaging machine comprising:
   a product conveyor supplying a series of products to the packaging machine;
   a carton feeder supplying cartons to the packaging machine;
   at least one packaging or wrapping station downstream from the carton feeder, at which cartons are fed into registration with groups of products to form product packages;
   a discharge station downstream from the at least one packaging or wrapping station for receiving and metering discharge of the product packages, the discharge station comprising:
      spaced drive belts arranged along a path of travel of the packages and configured to engage and accelerate movement of the product packages along the path of travel; and
      a metering assembly, including a plurality of pusher lugs moveable into engagement with the product packages being moved by the drive belts;
   wherein the product packages are accelerated sufficient to create a desired separation between successive product packages received by the discharge station whereupon the pusher lugs engage and move the product packages to discharge.

2. The packaging machine of claim 1, wherein the pusher lugs are located at selected elevations above and below the drive belts so as to engage portions of endmost products of the product packages where the products have a greater resistance to contact.

3. The packaging machine of claim 1, wherein the pusher lugs comprise pairs of vertically spaced lugs arranged to engage endmost products of the product packages adjacent a bottom portion and an upper portion of the endmost products.

4. The packaging machine of claim 1, wherein the drive belts are extended about a series of sprockets or pulleys mounted on supports coupled to a frame of the discharge station, wherein the supports are moveable with respect to the frame of the discharge station for adjustment of the drive belts toward and away from the path of travel of the product packages.

5. The packaging machine of claim 1, wherein the pusher lugs each comprise a body having a pushing surface and a cam portion, the cam portion engaging and moving along a cam track such that as the pusher lugs are carried into engagement with the product packages, the pusher lugs are pivoted toward and are maintained in engagement with the product packages as the product packages are moved toward a discharge end of the discharge station, after which the pusher lugs are pivoted away from the product packages.

6. The packaging machine of claim 1, further comprising a bed plate extending through the discharge station and arranged between the drive belts, the bed plate having an upper surface along which the product packages are supported and moved as they are accelerated along their path of travel by the drive belts.

7. A system for packaging products, comprising:
a product infeed;
a carton feeder supplying cartons;
one or more packaging stations for applying the cartons to or inserting groups of products into the cartons to form a series of product packages;
a discharge station arranged downstream from the one or more packaging stations, the discharge station receiving the product packages moving substantially in a line and comprising:
a pair of spaced drive belts arranged along opposite sides of the discharge station and configured to engage the product packages therebetween, and wherein the drive belts are driven at a rate substantially matching a pitch or rate of at least one downstream discharge conveyor and sufficient to create a desired space or separation between the successive product packages; and
pairs of product pushers moved at a rate substantially matching the rate of the drive belts, the product pushers configured to engage the product packages being moved by the drive belts and urge the product packages forwardly toward discharge to the at least one downstream discharge conveyor.

8. The system of claim 7, wherein the pairs of pusher lugs comprise pairs of vertically spaced lugs mounted along chains or belts and moved into engagement with the product packages on each side of the discharge station, the each pair of pusher lugs arranged to engage endmost products of the product packages adjacent a bottom portion and an upper portion of the endmost products.

9. The system of claim 8, wherein the pusher lugs each comprise a body having a pushing surface and a cam portion, the cam portion engaging and moving along a cam track such that as the pusher lugs are carried into engagement with the product packages, the pusher lugs are pivoted toward and are maintained in engagement with the product packages as the product packages are moved toward a discharge end of the discharge station, after which the pusher lugs are pivoted away from the product packages.

10. The system of claim 8, wherein the drive belts are extended about a series of sprockets or pulleys mounted on supports coupled to a frame of the discharge station, wherein the supports are moveable with respect to the frame of the discharge station for adjustment of the drive belts toward and away from the path of travel of the product packages.

11. The system of claim 7, further comprising a bed plate extending through the discharge station and arranged between the drive belts, the bed plate having an upper surface along which the product packages are supported and moved as they are accelerated along their path of travel by the drive belts.

12. The system of claim 7, wherein the cartons comprise wrap-style cartons fed into registration with the groups of products and wrapped thereabout.

\* \* \* \* \*